April 3, 1934.  A. McL. NICOLSON  1,953,817
PILOT TELEVISION SYSTEM
Original Filed Oct. 11, 1927  2 Sheets-Sheet 1

INVENTOR
ALEXANDER McLEAN NICOLSON
BY
Clyde A. Newton.
ATTORNEY

April 3, 1934.  A. McL. NICOLSON  1,953,817
PILOT TELEVISION SYSTEM
Original Filed Oct. 11, 1927  2 Sheets-Sheet 2
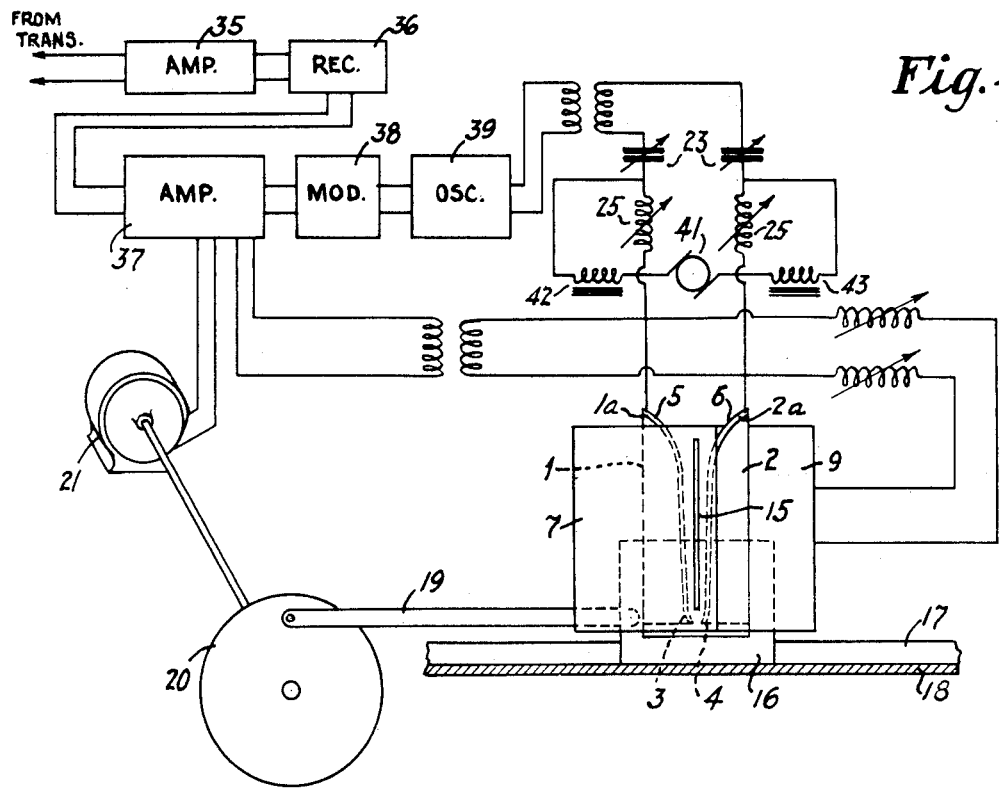
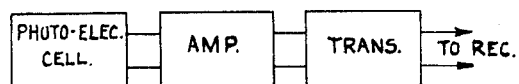
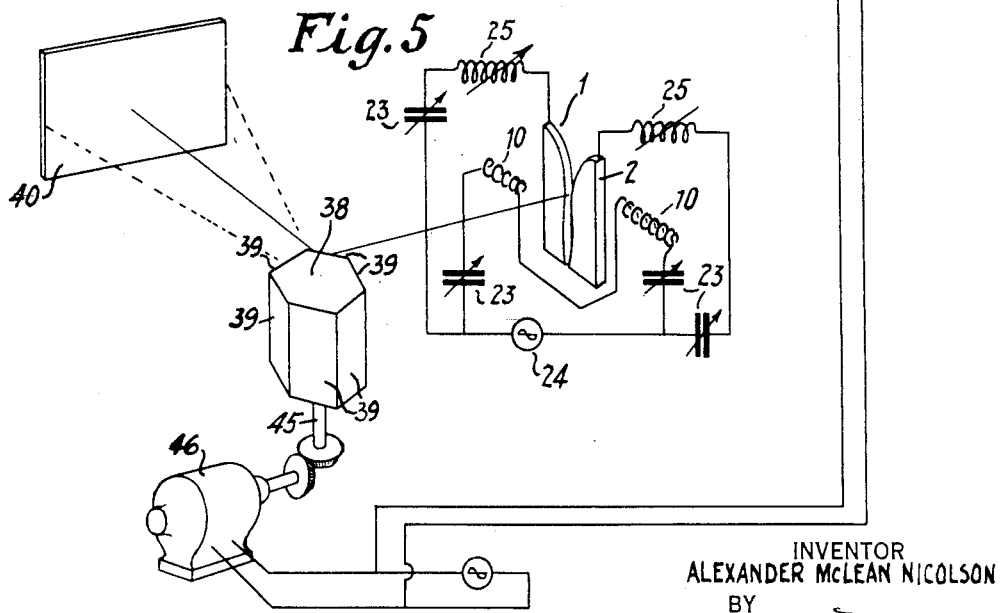
INVENTOR
ALEXANDER McLEAN NICOLSON
BY
ATTORNEY Patented Apr. 3, 1934

1,953,817

UNITED STATES PATENT OFFICE 1,953,817

PILOT TELEVISION SYSTEM

Alexander McLean Nicolson, New York, N. Y., assignor to Communication Patents, Inc., New York, N. Y., a corporation of Delaware Application October 11, 1927, Serial No. 225,415
Renewed March 21, 1930

26 Claims. (Cl. 178—6)

This invention relates to a method and apparatus for television and the like, and more particularly to a method and apparatus for so-called scanning adapted both for transmission and reception.

It is well known that for the purpose of transmission of images either by wire line or radio, it is necessary to determine the light intensity of each unit area of the object whose image is to be transmitted and to send an indication of some sort which is proportional to the light intensity of such area. At the receiver, it is necessary to control a source of light, so that its intensity corresponds or is proportional to the light intensity of the particular corresponding unit area of the object, and also so that its relative position on the receiving screen corresponds to the relative position of the corresponding unit area of the object.

It is also well known that in order to achieve television of moving objects, it is necessary to transmit approximately sixteen (16) complete images of the object per second: if it is desired to cover a screen having one hundred (100) units of area in each dimension and therefore containing ten thousand (10,000) units of area, and if an image of a moving object is to be transmitted, it is necessary to scan ten thousand (10,000) units of area sixteen (16) times each second: in other words, the apparatus must have a scanning speed of one hundred and sixty thousand (160,000) units of area per second. If the screen is rectangular and is to be scanned in lines approximately parallel, it is necessary to scan in one direction one hundred (100) times as fast as in the other direction: that is to say, considering a spot of light playing across a screen, the spot traverses the screen on a line in one direction in one sixteenth of a second, whereas it must traverse the screen at right angles to the said dimension one hundred (100) times as fast or in one sixteen hundredths (1/1,600) of a second. Such speeds are difficult to obtain in practice because of the difficulty of constructing moving elements, such as wheels, with sufficient peripheral speed, and moreover, because of the difficulty of synchronizing at such speeds transmitting and receiving apparatus, when in case such speeds are obtained.

It is an object of this invention to provide a method and apparatus for television, in which high speed scanning is obtained without the use of excessive speeds of moving masses.

It is a further object of this invention to provide a method and apparatus for obtaining high scanning speed by the production of a moving arc or other discharge playing between relatively stationary electrodes.

It is a further object of this invention to provide such a system and apparatus in which the high speed component of light travel is introduced by the travel of a luminous electrical discharge between relatively stationary electrodes and in which the relatively low speed component is introduced by mechanical movement of the electrode system or reflecting system.

Still other objects and advantages of my invention will be apparent from the specification.

The features of novelty which I believe to be characteristic of my invention are set forthwith particularly in the appended claims. My invention itself, however, both as to its fundamental principles and as to its practical embodiments will best be understood by reference to the specification and accompanying drawings, in which:—

Figure 4 is a diagrammatic view of a receiving apparatus similar to Figures 1 and 2; and, Figure 5 is a diagrammatic view of a modified form of transmitting and receiving apparatus, according to my invention.

Figure 1:
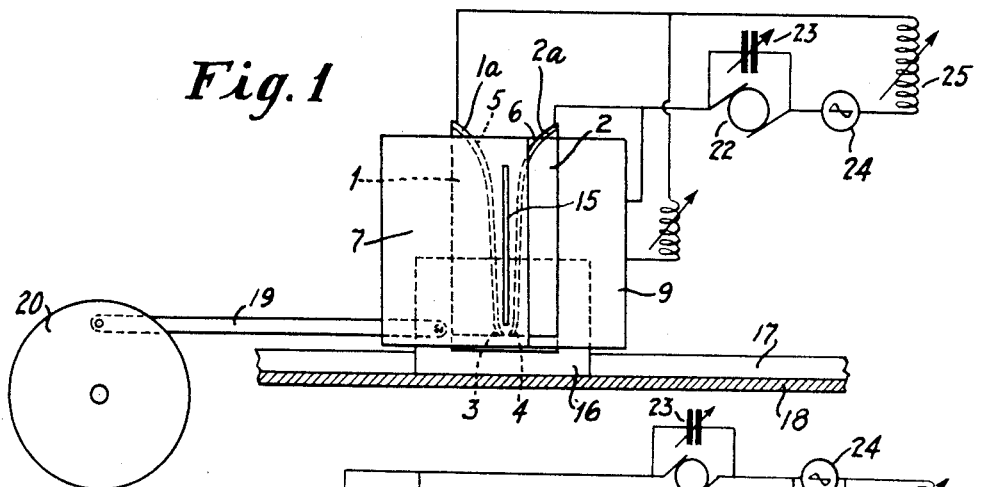
Figure 1 is a front elevation of a discharge producing system showing the focusing screen and lens removed.

In accordance with my invention, I provide a pair of relatively stationary electrodes in the form of a discharge gap, presenting to each other a pair of edges, the distance between which continuously increases. The distance between the electrodes at one side is preferably made very small, and preferably but not necessarily continuously increases toward the other side, and adjacent the other side increases very much more rapidly, the electrodes at that point flaring very rapidly. Suitable means are provided for causing a magnetic field to traverse the gap between the electrodes in such manner that if a voltage be applied between said electrodes of sufficient magnitude to produce a discharge or arc between said electrodes, the magnetic field operates in the manner of the well known blow-out magnet: that is, the arc is caused to travel transversely across the gap from the point of initiation until it reaches the flaring portion of the electrodes and is extinguished. It is apparent that by controlling the distance between the electrodes, that is, the longitudinal length of the path of the discharge, the width of electrodes, that is the transverse distance to be covered by the discharge during its movement, the potential applied between the electrodes, the current carried by the discharge, and the strength of the blow-out field, very high speeds of transverse travel of the discharge may be obtained, since the discharge has no physical mass. If an alternating potential be applied to the electrodes and a corresponding alternating field be impressed across the gap, the effect upon the travel of the arc or discharge after it has started, will be the same as though it were produced by direct current. Moreover, if the alternating potential be made such that it is sufficient to start the discharge when at its peak value, but not sufficient at other times, the discharge will initiate itself periodically as such peak voltage is impressed upon the electrodes.

The electrodes may operate in open air, or in a chamber containing air at any desired pressure, above or below atmospheric, or any gas or mixture of gases, with or without the addition of finely divided solids or liquids, chosen for optimum results.

By the control of the factors above referred to, the arc or discharge may be caused to travel across the gap in a little less than the time necessary for the voltage to build up to its peak value again. The speed of travel of the discharge may also be controlled by controlling the pressure in which the discharge takes place and by the nature of the atmosphere in which it operates. It will thus be seen that it is possible to produce a series of arcs or discharges moving across the gap, the discharges following each other at twice the frequency of the alternating current utilized, and each arc or discharge beginning just after the previous arc has ceased.

If two such electrode systems are provided, by control of the factors referred to above, it is possible to cause the discharges in both systems to move in synchronism.

Figure 3:
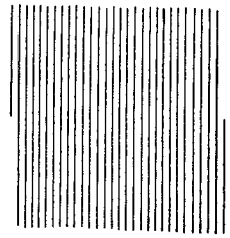
Figure 3 is a diagrammatic view of the scanning pattern traced by the apparatus according to my invention.

If now, the electrode systems be moved in the plane of and in a direction normal to the path of the discharge, and the light produced by the discharge be allowed to pass through a narrow slit and upon a lens which reflects it upon the screen, the point of light produced upon the screen will travel across the screen in a series of adjacent parallel lines, similar to the pattern shown in Figure 3: and it will further be noted with reference to Figure 3 that the component of motion corresponding to vertical travel of the spot of light is introduced by the travel of the discharge, whereas the horizontal component is introduced by the movement of the electrode system, and that whereas the movement of the electrode system need only be sufficient to cause the path of light to travel horizontally across the screen once in one sixteenth ($\frac{1}{16}$) of a second, the speed of travel of the arc or discharge must be sufficiently high to cause the spot to move across the screen from bottom to top or vice versa at a large multiple of its speed of horizontal travel. This relatively high speed may be obtained according to my invention without the difficulty of moving physical masses at a high rate of speed.

Under certain conditions, the horizontal travel of the light spot may be introduced without any movement of the electrode system by permitting the light therefrom to fall upon a reflecting system such for example as a rotating mirror, rotated at such speed that the beam of light plays horizontally across the screen in one sixteenth ($\frac{1}{16}$) of a second.

In the case of a transmitter, the light produced by the scanning system may be allowed to fall upon the object whose image is to be transmitted, and one or more photo-electric cells may be exposed to the said object in a manner to be illuminated by the light falling therefrom. The output of the photo-cell or cells may be amplified to the extent desired, and utilized to control any suitable type of transmitter whether wire line, carrier frequency, or radio frequency oscillations. In addition, it is desirable, also, to transmit the alternating current serving to cause the discharge, and also the alternating current which will preferably be used to introduce the component of mechanical motion: such currents may be transmitted on separate channels, such as separate wire lines, in the case first referred to, or, in separate modulation bands in the case of carrier frequency or radio frequency oscillations.

In the receiver, the various components will be separated in a manner well understood in the art, and after the necessary or desired amplification, are utilized to control similar elements at the receiver.

Figure 2:
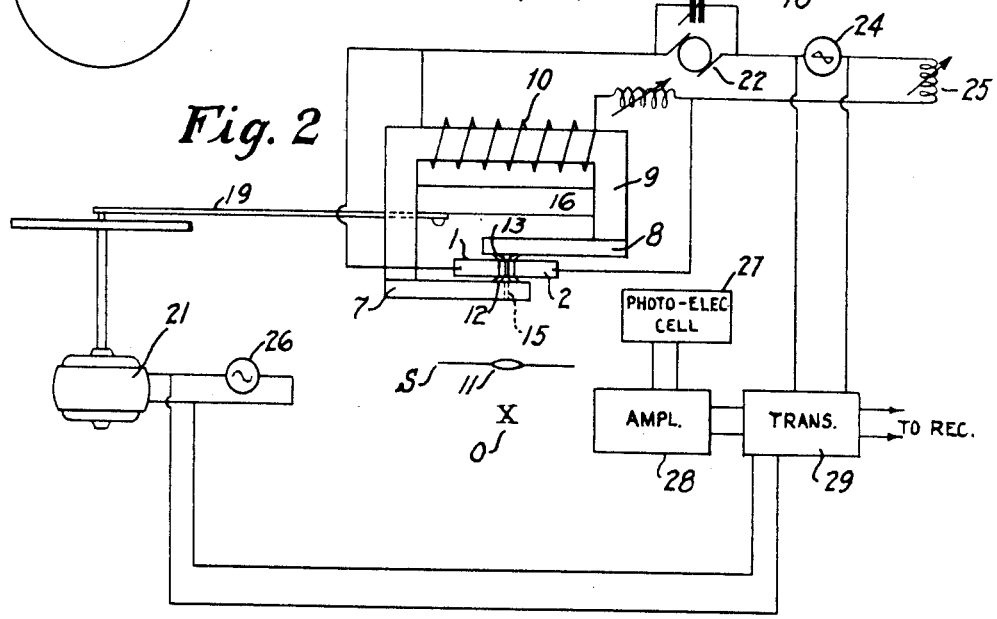
Figure 2 is a top plan view of the apparatus shown in Figure 1, showing the focusing screen and lens in place; also, showing diagrammatically the electrical system for converting light into electrical currents or potentials.

Referring now more particularly to Figure 1, 1 and 2 designate the electrodes preferably of non-magnetic material, such as brass, and having a facing $1a$ and $2a$ of suitable conductor chosen to have the desired operating characteristics. The facing may, for example, be of platinum or other suitable material having long life under operating conditions. At the lower ends, the electrodes 1 and 2 are provided with portions 3 and 4 which project toward each other, forming a gap of very small length, at which point the arc or discharge may be initiated. The length of the discharge from this point upward may, and preferably will be, gradually increased by increasing the separation between the electrodes and finally at the top the electrodes are provided with flaring faces 5 and 6 having a separation sufficient to break down the arc or discharge at such point, although it will be understood that this is not essential.

For the purpose of causing the travel of the arc or discharge up the gap, there is provided a blow-out magnet having a core 9 of magnetic material, provided with pole pieces 7 and 8 arranged in front and in back of the electrodes 1 and 2 respectively. A suitable coil 10 is provided on the core 9 for the purpose of establishing a flux therein. The pole pieces 7 and 8 are preferably provided with projections 12 and 13 on their inner sides, arranged to concentrate the flux in the gap to be transversed by the discharge. The pole piece 7 is likewise provided with a longitudinal slit 15, through which the light produced by the discharge may pass to the lens 11 mounted in opaque screen "S". The electrodes 1 and 2 may be energized by a suitable alternating current source 24, which may also energize the blow-out magnet 9, and in addition, a direct potential may be provided by suitable source 22 when desired. The value of the current in the discharge circuit and also in the blow-out magnet, may be controlled by regulating the circuit resistances or impedances, or both, by means of suitable variable inductances 25, and condensers 23 positioned at desired points and which may also serve to tune one or more branches of the circuit. The electrode system may be mounted upon a block 16 arranged to slide upon a guide 17 on a suitable support or table 18, and may be driven by a link 19 attached to rotor 20 driven by a suitable prime mover, such as alternating current motor 21, energized by a suitable source 26. In the operation of the transmission system, the object "O", whose image is to be transmitted, may be placed as at "X" in front of the opaque screen "S", and will be scanned by the spot of light produced by the travelling discharge. The photo electric cell 27, which is exposed to the object, may be of any suitable type known in the art, and its output may be amplified by the amplifying system 28 and supplied to the transmitter 29. A voltage or current derived from the alternating sources 24 and 26, may also be supplied to the transmitter 29 for transmission to the receiving system.

The transmitter 29 may operate in any known manner to transmit the output of the system to the receiver. Under certain conditions, the transmitter may operate to control the amplitude of a current flowing in a wire line: under other conditions, the transmitter may transmit modulated carrier waves, and under other conditions, it may transmit radio frequency oscillations through space: and the various synchronizing frequencies which are transmitted may be transmitted as modulations on separate modulation channels.

Referring now more particularly to Figure 4, I have shown a receiver adapted to operate in synchronism with the transmitter already described, in response to signals received from said transmitter. The receiver comprises a pair of relatively stationary electrodes, substantially identical with those already described in connection with the transmitter. Blow-out magnet 10 is also provided, the transmitting and receiving arrangements being substantially similar, since it is desirable in each case that the arcs or discharges, travelling across the gap under the influence of the blow-out field, should move at the same speed or at rates of speed whose ratio is constant. The incoming signals may be amplified by suitable amplifier 35, and if they are of radio frequency, they may be detected by a suitable detector 36 and further amplified, if desired, by amplifier 37, which may comprise the necessary filter systems for separating the various components, any or all of which may be further amplified after such separation, if necessary or desired.

The oscillations corresponding to the frequency of the alternating current discharge in the transmitter, are impressed upon the arc electrodes of the receiver, and also upon the blow-out magnet. The strength of current in the gap is preferably adjusted at such value that the discharge has a very slight luminosity and that a small increase in the discharge current will cause a large increase in luminous intensity. This incipient illuminating discharge I term a pilot arc or discharge. The currents corresponding to the output of the photo electric cell at the transmitter, after amplification in the amplifier 37, are preferably impressed upon a modulator 38 acting to control the amplitude of oscillations generated by the oscillator 39, the output of which may be super-imposed upon the discharge gap. In order to prevent the modulations or fluctuations of the oscillator output current from interfering with the speed of travel of the arc or discharge, the frequency of oscillator 39 will be chosen preferably considerably higher than the frequency of the pilot discharge, and at the same time the intensity of the oscillator output is so regulated that by itself it cannot cause a discharge, and therefore follows the path of the pilot discharge. This pilot discharge does not, in itself, have any considerable luminous intensity: however, the additional current from the output of the oscillator 39 is sufficient to increase the luminous intensity of the pilot discharge to the extent desired. In addition, a direct current may also be utilized if desired, as by the inclusion of direct current source 41 and chokes 42 and 43.

For the purpose of preventing inter-action between the oscillations of various frequencies, the various circuits carrying only one frequency may be tuned to that particular frequency for the purpose of excluding others, as by means of inductances 25 and capacities 23.

The arc system is moved, as in the case of the transmitting apparatus through a link 19 by a driver 20 rotated by a suitable synchronous prime mover 21, which in turn, is operated by the synchronizing currents transmitted from the transmitter and received at the receiver.

It will be understood, therefore, that the position and intensity of the luminous discharge corresponds at any instant to that desired, and that if the light from the moving discharge be projected upon a screen by means of a suitable reflecting system, the image of the transmitted object will appear thereon.

Referring now more particularly to Figure 5, I have shown an arrangement in which the electrodes 1 and 2 are not moved, the component of motion which was introduced by the back and forth movement of the electrode system in Figures 1 to 4, being in this instance introduced by allowing the light from the discharge to fall upon a system of rotating mirrors, which project the light to the screen or object. In this arrangement, there may be provided a mirror block 38, upon which there are mounted a number of mirrors 39, for example, six, in the form of a hexagonal prism. The mirror system is mounted upon a shaft 45, so that it may be rotated by means of a suitable driving motor 46, and is so arranged that in its rotation, the beam of light falling upon it from the electrode system, is swept through an angle just sufficient to cover the object or screen in $\frac{1}{6}$ second, as a result of which, it will be understood that the screen 40 will be scanned in vertical lines by the movement of the arc or discharge, while the beam is caused to move slowly across the screen 40 in a horizontal direction, due to the changing angle of incidence of the beam impinging upon the mirrors 39: otherwise, the arrangement is similar to that already described, and it is not believed necessary to describe it further in detail.

It is clear that the arrangement may be utilized in a receiving system, similar to that of Figure 4, the only change being the substitution of the rotating mirror system of Figure 5 for the electrode sliding mechanism of Figure 4.

While I have shown and described certain preferred embodiments of my invention, it will be understood that modifications and changes may be made without departing from the spirit and scope of my invention, as will be understood by those skilled in the art.

Certain improvements on the system herein disclosed and claimed are disclosed and claimed in my copending application, Serial No. 397,826, filed October 7, 1929.

I claim:

1. Scanning apparatus for television and the like, comprising, in combination, an electrode system including a pair of oppositely disposed, relatively stationary electrodes, means for producing an illuminating electrical discharge in said electrode system and corresponding to a unit area of the subject, and means for causing said discharge to travel progressively on said electrode system to cover the area to be scanned in a series of successive substantially parallel lines.

2. Scanning apparatus for television and the like, comprising, in combination, an electrode system including a pair of oppositely disposed, relatively stationary electrodes, means for producing an illuminating electrical discharge on said electrode system corresponding to a unit area of the subject, and means for causing said discharge to travel progressively on said system to cover the area to be scanned in a series of successive juxtaposed substantially parallel straight lines.

3. Scanning apparatus for television and the like, comprising, in combination, an electrode system including a pair of oppositely disposed, relatively stationary electrodes, means for producing an illuminating electrical discharge on said system corresponding in position to a unit area of the subject to be reproduced and having a varying light intensity corresponding in light value to the corresponding unit area of said subject, and means for causing said discharge to travel progressively in said system to cover the surface to be scanned in a series of substantially parallel straight lines.

4. In a system for television and the like, an electrode system including a pair of oppositely disposed, relatively stationary electrodes, means for producing an illuminating electrical discharge of constant intensity on said system, means for causing said discharge to travel progressively on said system to cover an area to be scanned in a pattern comprising juxtaposed and substantially straight lines to illuminate successively all unit areas of the subject, means for converting the intensity of illumination of unit areas of the subject to electrical variations, a second electrode system, means for producing a second discharge on said second system corresponding in relative position to the position of said first discharge, and means responsive to said electrical variations for controlling the luminous intensity of said discharge in accordance with the intensity of illumination of the corresponding unit area of the subject.

5. Scanning apparatus for television and the like, comprising a pair of spaced electrodes forming an electrical discharge path of substantially the width of the area to be scanned, and having a closely spaced discharge initiating portion at one side of said path and a divergent discharge breaking portion at the other side thereof, means for periodically initiating a luminous electrical discharge on said electrodes, means for causing periodic travel of said discharge from said discharge initiating portion of said path to said discharge terminating portion, and means for causing the light to move in a direction normal to the movement of said discharge, to cause said discharge to scan the subject area in a pattern comprising a plurality of juxtaposed and substantially straight lines.

6. The method of scanning for television and the like, which comprises successively illuminating unit areas of the area to be scanned by magnetically deflecting a periodic luminous electrical discharge to cause it to travel laterally over a linear path and moving the path over which the light from said discharge travels in a direction normal to the deflection movement of said discharge to cause said discharge to scan the subject in a pattern comprising a plurality of juxtaposed and substantially straight lines.

7. The method of scanning for television and the like, which comprises successively illuminating unit areas of the area to be scanned by magnetically deflecting a luminous electrical discharge to cause it to travel laterally over a linear path, moving the path over which the light from said discharge travels in a direction normal to the movement of said discharge to cause said discharge to scan the subject in a pattern comprising juxtaposed and substantially straight lines, and controlling the luminous intensity of said discharge at each area in accordance with the light intensity desired at such area.

8. The method of scanning for television and the like, which comprises periodically producing an illuminating electrical discharge, magnetically deflecting said discharge to cause it to travel laterally over a linear path, and causing the light to move in a direction normal to the direction of travel of said discharge, whereby said discharge successively scans all unit areas of the subject.

9. A television system comprising an arc path including spaced, relatively stationary rails having an arc initiating portion and an arc terminating portion, means for periodically initiating an electric arc on said rails, means for producing a local magnetic field to cause said arc to traverse said path, and means for producing variations in intensity of said arc during travel to produce an image.

10. The method of producing a television image by an electrical discharge which comprises producing a luminous arc, magnetically deflecting said arc to cause travel thereof, and varying the luminosity of said arc during travel thereof to produce differences in tonal light value of the image.

11. The method of producing a television image by an electrical discharge which comprises periodically initiating luminous arc discharges, magnetically deflecting said discharges to cause travel thereof, and varying the luminosity of said discharges during the travel thereof to produce differences in tonal light value of the image.

12. The method of producing a television image by an electrical discharge which comprises periodically ionizing the gaseous path between relatively stationary rail electrodes to produce a pilot discharge, applying a relatively strong magnetic field to said discharge to produce magnetic deflection thereof to scan a screen, applying a potential across said electrodes to produce a luminous discharge superimposed on said pilot discharge across said path when ionized, and varying the luminosity of said discharge to produce differences in tonal light value of the image.

13. The method of electrically producing an image which comprises periodically initiating an arc, generating and applying a relatively strong local electro-magnetic field to said arc to cause deflection thereof, and superimposing on said arc, current variations proportional to light variations to cause said arc to reproduce tonal light variations of the image to be produced.

14. The method of electrically reproducing the image of a subject which comprises generating an arc, magnetically moving the arc over a path to scan the subject, converting the light variations of the subject so scanned into electrical variations, scanning a receiving screen by a moving receiving arc by magnetically deflecting said receiving arc over a path, and superimposing on said receiving arc the electrical variations produced by the transmission scanning.

15. In a television system, a transmitter scanning arc path including spaced, relatively stationary rails, having an arc initiating portion and an arc terminating portion, means for initiating a self-luminous arc on said rails, means for producing a relatively strong, local magnetic field across said rails to magnetically move the arc over a path to scan the subject, means for converting light variations of the scanned subject into electrical variations, a receiver arc path including spaced, substantially parallel, relatively stationary rails, having an arc initiating portion and an arc terminating portion, means controlled by said first means for initiating a self-luminous arc on said rails, means for producing a relatively strong, magnetic field across said rails to deflect the receiver arc, and means for causing said last mentioned arc to respond in light value to said electrical variations.

16. In a television system, a transmitter having a scanning arc path including spaced, relatively stationary rails, having an arc initiating portion and an arc terminating portion, means for producing an electro-dynamic self-luminous arc on said rails, means for generating a relatively strong, magnetic field across said rails to magnetically move the arc over a path to scan the subject, means for converting light variations of the subject scanned to electrical variations, a receiver comprising a receiving arc path including spaced, substantially parallel, relatively stationary rails, having an arc initiating portion and an arc terminating portion, means for producing an electro-dynamic, self-luminous arc on said rails means for producing a relatively strong, local magnetic field across said rails to magnetically move the receiver arc over its scanning path, means controlled by said transmitter for synchronizing said arcs, and means for causing said last mentioned arc to respond in light value to said electrical variations.

17. In a television system, a transmitter scanning arc path comprising spaced, relatively stationary rails, having an arc initiating portion and an arc terminating portion, means for producing a moving electro-dynamic, self-luminous arc on said rails, means for generating a relatively strong, magnetic field across said rails to magnetically move the arc over a path to scan the subject, means for converting light variations of the subject scanned to electrical variations, a receiver comprising a receiver arc path including spaced, substantially parallel, relatively stationary rails, having an arc initiating portion and an arc terminating portion, means for producing a moving electro-dynamic, self-luminous arc on said rails, means for producing a relatively strong, local magnetic field across said rails to magnetically move the receiver arc over its scanning path, means controlled at said transmitter arc path for synchronizing therewith the arc at said receiver arc path, and means for causing said last mentioned arc to respond in light value to said electrical variations.

18. A television system, comprising a master station and a subservient station, an arc path including spaced, relatively stationary rails, having an arc initiating portion and an arc terminating portion at each of said stations, means for initiating in synchronism in both stations self-luminous arc discharges, and means for generating and applying to said discharges a strong electro-magnetic field to cause synchronous deflection of said discharges over a scanning path.

19. A television system, comprising a master station and a subservient station, an arc path including spaced, relatively stationary rails, having an arc initiating portion and an arc terminating portion at each of said stations, means for initiating in synchronism in each station a self-luminous arc discharge, means at each station for producing across said arc path a strong magnetic field to deflect said arcs in synchrony, and means for varying the light produced by said receiver arc under the control of the master station.

20. In a television system, a transmitting screen and a receiving screen, both of said screens comprising electrode rails, means for producing an arc between said electric rails, means for propagating said arcs along the rails of both of said screens at a rate sufficient to cause said screens to appear as solid illuminated fields, means for projecting light from one of said arcs successively over unit areas of an object to be scanned, a photo-electric cell for obtaining current variations characterized by the varying densities of light and shade in said object, means for transmitting said current variations to said second screen, and means in said second screen for varying the illumination thereof proportionally to the variation in currents from said photo-electric cell.

21. In a television system, a plurality of illuminated screens comprising electrode rails, a single oscillator for energizing said rails to produce a discharge therebetween, means for supplying the output of said oscillator to both said screens, and means for generating and applying a strong magnetic field across said rails to magnetically deflect said discharge at each screen.

22. In a television system, a transmitter scanning screen, comprising electrode members, means for causing an arc between said means, means for developing a magnetic field for developing the arc across the scanning screen, means for detecting varying intensities of light and shade of an object, a receiving screen employing a similar electro-magnetic arc similarly propelled, means for transmitting said photocell currents to said receiving screen, and means at said receiving screen for modulating said arc in accordance with said photo-electric currents.

23. In an illuminating screen comprising an arc path, means for locally generating a magnetic field in which said path is located, means for initiating an arc in said path, and means for moving said electrodes whereby said arc is directed along adjacent paths.

24. In an illuminating screen comprising rail electrodes, means for locally generating a magnetic field in which said electrodes are located, means for initiating an arc on and means for moving said electrodes to direct said arc along adjacent paths.

25. The method of electrically scanning an object for television and the like by producing a moving illuminating discharge scanning an object in unit areas, which comprises creating an arc magnetically moving the arc to cause said arc to traverse at a relatively high rate of speed a particularized path for completely scanning said object in unit areas.

26. A luminous screen comprising a gas filled envelope containing rail electrodes, means for creating an arc between said electrodes, means for obtaining a locally generated magnetic field in which said electrodes are positioned for creating a driving force on said arc, and means for moving said electrodes to direct said arc along adjacent paths.

ALEXANDER McLEAN NICOLSON.